United States Patent [19]

Schabert et al.

[11] 4,238,290
[45] Dec. 9, 1980

[54] NUCLEAR REACTOR INSTALLATION

[75] Inventors: Hans-Peter Schabert; Jörgen Hoffmann, both of Erlangen, Fed. Rep. of Germany

[73] Assignee: Kraftwerk Union Aktiengesellschaft, Mülheim, Fed. Rep. of Germany

[21] Appl. No.: 869,628

[22] Filed: Jan. 16, 1978

Related U.S. Application Data

[63] Continuation of Ser. No. 590,672, Jun. 26, 1975, abandoned.

[30] Foreign Application Priority Data

Jun. 26, 1974 [DE] Fed. Rep. of Germany ....... 2430724

[51] Int. Cl.² .............................................. G21C 9/00
[52] U.S. Cl. ........................................ 176/38; 176/37
[58] Field of Search ................... 60/644, 646; 176/37, 176/38; 251/62, 63, 63.5, 285, 318; 137/528, 82; 122/32; 91/5; 92/13.1

[56] References Cited

U.S. PATENT DOCUMENTS

| 981,313 | 1/1911 | Robinson | 251/63.5 |
|---|---|---|---|
| 2,584,847 | 2/1952 | Dahl | 251/285 |
| 3,140,588 | 7/1964 | Brown | 60/644 |
| 3,186,169 | 6/1965 | Hauser | 91/5 |
| 3,245,325 | 4/1966 | Giusti, Jr. et al. | 92/13.1 |
| 3,384,550 | 5/1968 | Hanzglek | 176/38 |
| 3,400,049 | 9/1968 | Wolfe | 176/38 |
| 3,431,168 | 3/1969 | Kjemtrup | 176/37 |
| 3,446,171 | 5/1969 | Panoff et al. | 176/38 |
| 3,714,953 | 2/1973 | Solvang | 137/528 |
| 3,811,279 | 5/1974 | Vogeli | 251/63.5 |

Primary Examiner—Samuel W. Engle
Assistant Examiner—S. A. Cangialosi
Attorney, Agent, or Firm—Kenyon & Kenyon

[57] ABSTRACT

In a nuclear reactor installation, a steam generator's live-steam line leading through the containment, is equipped with a fast-acting shut-off valve, to shut off the steam in the event of a line break. If the steam pressure rises in the generator, the valve acts as a safety valve and releases a small amount of steam, so that there is no danger of damage to the steam generator. The invention is of interest particularly for light-water reactors, e.g., pressurized-water reactors.

10 Claims, 4 Drawing Figures

NUCLEAR REACTOR INSTALLATION

This is a continuation, of application Ser. No. 590,672, filed June 26, 1975.

BACKGROUND OF THE INVENTION

The invention concerns a nuclear reactor installation with a containment and a live-steam line which leads from the inside of the containment to the outside and contains a fast-acting valve with an aperture cross section corresponding to the cross section of the live-steam line and with a valve disk which is closed in case of a leak in the live-steam line, under the action of a pressure medium.

The fast-acting valve permits to shut off the live-steam line quickly, particularly if in the case of a leak the danger exists of steam, which might possibly be radioactively contaminated due to an accident, getting to the outside. However, the closing means of necessity also that the cooling of the reaction installation, i.e., the transport of energy in the form of the steam flow, is interrupted. This gives rise to problems, as it is not always possible, even with a fast shutdown of the nuclear reactor, to lower the production of energy fast enough to keep particularly the pressure within permissible limits in the generation of steam. For these problems, the invention attempts to find a solution in the form of a valve combination which is to serve at the same time as a shut-off valve and a safety valve.

SUMMARY OF THE INVENTION

According to the invention, an opening mechanism with pressure-dependent action, which opens at a pressure higher than the operating pressure of the live-steam line but releases no more than half the aperture cross section, is associated with the valve disk. This makes possible a pressure limitation which prevents the live-steam line and the steam generating plant feeding the former from being overloaded. A differentiation, which is important for the invention, is made here between the normal operation of the valve, when the aperture cross section corresponding to the full cross section of the line is released so that there is practically no pressure drop in the valve, and the case of an accident, when the valve acts as a safety valve. In the latter case it is prevented by the limitation of the aperture cross section in accordance with the invention that the steam, which can escape unimpeded in the event of a break of the live-steam line, has too high an outflow rate and thereby loads or stresses the steam generating system excessively, or damages the nuclear reactor by too fast a cooling rate.

In one embodiment of the invention, the opening mechanism includes a stop which prevents, at least for a short time, the aperture cross section from being opened more than 30%. This stop can be provided as an additional element in a valve which can be opened fully in the normal case. After shutting off in accordance with the meaning of a fast-acting valve, however, the stop becomes effective and limits the aperture.

The limitation to 30% of the aperture cross section need not be adhered to rigidly in all operational cases. The stop may advantageously also comprise an adjustable slide, at which the valve disk stops when opening. A slide is to denote here any device which is adjustable in the direction of the opening stroke of the valve disk and limits the travel of the valve disk. However, the slide need not engage the valve disk directly. It is also conceivable that the stop is associated with the actuating mechanism of the valve disk, e.g., with a shaft which leads to a piston of the drive mechanism. Such a slide can be adjustable by a motor by means of a screw thread, particularly a spindle. However, it is also conceivable that the movement of the slide or another limitation of the opening stroke of the valve disk is accomplished through the action of a pressure medium.

Besides the above-mentioned embodiment of the stop as a slide, which allows continuous adjustment of the opening stroke, the valve can be simplified by associating two open positions having a cross section smaller than the aperture cross section, with a pressure medium actuator and/or the opening mechanism in a pressure or time relationship. Thus, two different open positions, which are different from each other but are fixed in themselves, are provided for reopening the valve after a fast shut-off. The choice of the opening cross section used here depends advantageously on the preceding power production, in order to make possible a power removal matched to the load by the fast-acting valve acting as a safety valve.

A limitation of the closing movement, which gives a residual aperture cross section of the valve of between 5 and 20% during the closing process, may also be associated with the valve disk. It is hereby accomplished also for the case of an accident and the closing of the fast-acting valve caused thereby, that the removal of live steam and thereby, continued cooling of the nuclear reactor is possible. As the valve was not closed completely, the stress on the valve disk and the valve seat is substantially reduced as the shock-like landing of the valve disk by the fast shut-off is eliminated or at least does not occur so often. Also the limitation of the closing movement, which determines the smallest cross section still immediately obtainable in the case of a fast shut-off, may be adjustable. The limitation of the closing movement is advantageously reduced to zero in a time span of 10 to 60 seconds, i.e., the steam removal is throttled down for the time interval mentioned, more-and-more, until the complete closing is finally accomplished.

It is advantageous for all embodiments of the invention if the valve disk with its valve seat forms the shape of an annular Venturi tube in the vicinity of the closed position. One can thereby attain the velocity of sound in the vicinity of the nozzle, i.e., at the valve disk, such that a uniform limitation of the outflow rate is achieved over a wider range of pressures. This purpose is achieved in a simple manner by making the valve disk conical at the rim with a smaller angle than that of the likewise conical valve seat.

BRIEF DESCRIPTION OF THE DRAWINGS

In the accompanying drawings.

DETAILED DESCRIPTION OF THE INVENTION

Figure 1:
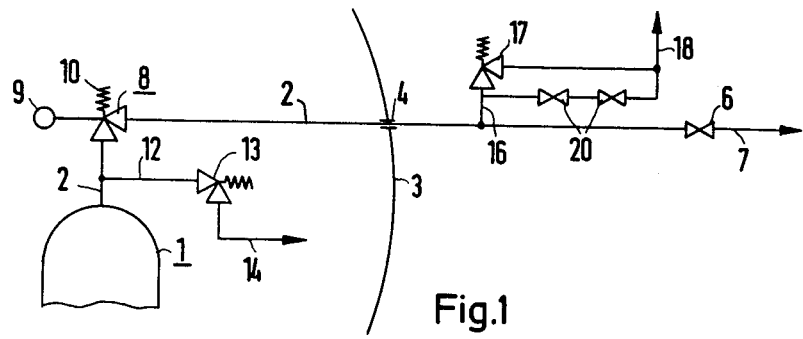
FIG. 1 is a flow diagram.

To explain the invention in further detail, an embodiment example will be described in the following, referring to the drawing.

In FIG. 1 is shown schematically part of a nuclear reactor installation with a pressurized-water power reactor of, say, 1000 MWe. Of this installation can be seen in the figure a steam generator 1, which feeds a live-steam line 2. The steam generator is arranged in a containment 3, which encloses all the components of the primary loop. Among them, although not shown, are, in addition to the indicated steam generator 1, a reactor pressure vessel with the reactor core and three other steam generators, which are connected to the reactor pressure vessel in the same manner as the steam generator 1.

The live-steam line 2, from the output of the generator 1, is brought through the containment 3 by means of a feed-through 4. A similar feed-through can be provided in the area of the secondary shield, not specifically shown. Outside the containment is mounted a shut-off valve 6, from which the outer line part 7 of the live-steam line 2 leads to a steam turbine, not specifically shown.

Inside the containment, there is installed in the train of the live-steam line 2, a fast-acting valve 8 according to the invention. Its drive mechanism is designated as a whole with 9. The new valve 8, which is designed as a corner valve, can become effective also as a safety valve, as indicated by the spring 10. By the term "safety valve" is meant a normally-closed valve which opens automatically in response to excessive pressure in the pipe line with which the valve is associated.

A branch 12 of the line 2 ahead of the fast-acting valve 8 leads to an inner safety valve 13. The safety valve 13 may advantageously have a response pressure which is a few bar higher than the response pressure of the valve 8. Its blow-off line 14 may also lead to a blow-down tank.

Outside the containment 3, a line 16 is connected to the live-steam line 2 ahead of the shut-down valve 6; it leads, on the one hand, to an exhaust 18 via a safety valve 17. The exhaust 18 may also be equipped with a sound absorber. Parallel to the safety valve 17 are arranged two series-connected so-called blowdown control valves 20, which may optionally be of the same design, and which make possible the controlled blowdown of live steam, for instance, for shutting down the nuclear reactor in case of an accident.

Figure 2:
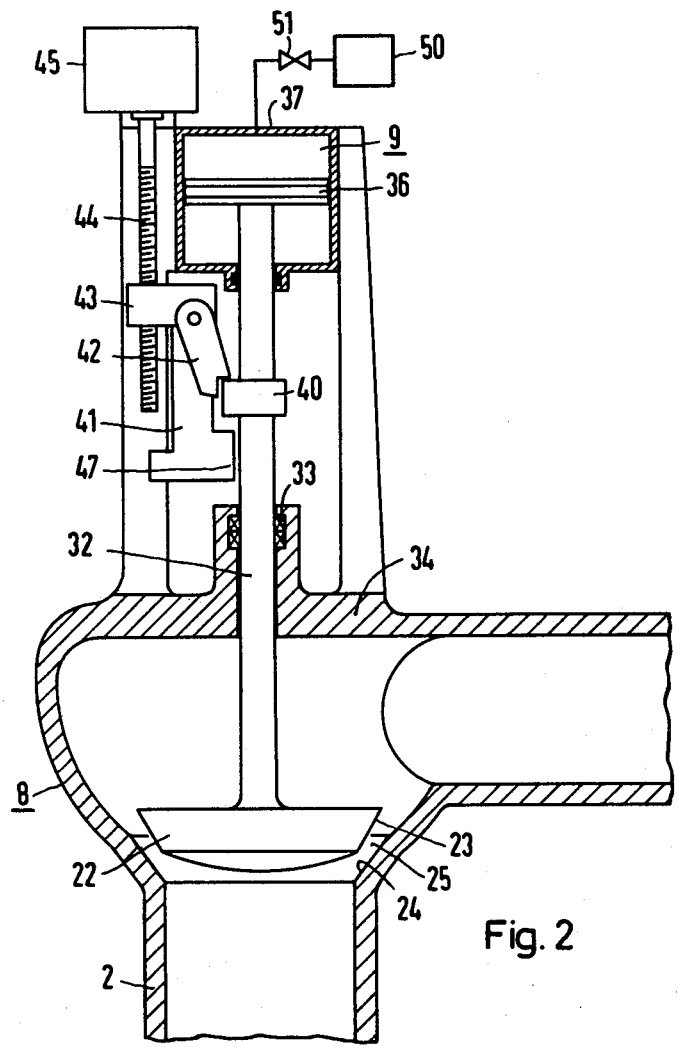
FIG. 2 is a vertical section of a fast-acting valve.

The fast-acting valve 8 is shown in FIG. 2 in a cross section. Its valve disk 22 is matched to the cross section of the live-steam line 2. For a diameter of the line 2 of 700 mm, for instance, the diameter of the valve disk 22 has the same size. The valve disk 22 may be armored throughout its outer rim 23, so that a particularly high strength is obtained. The same applies to the valve seat 24. The angles of inclination of the rim 23 of the valve disk, which is conical, and the valve seat 24 with, for instance, 60° and 90°, are chosen so that for an aperture cross section of about 15% of the line cross section, an expanding Venturi tube results in the region 25.

The valve disk 22 is provided with a stem 32 which is brought through the cover 34 of the valve 8 by means of sealing rings 33. The stem 32 leads to the pressure-medium actuator 9. The latter comprises a piston 35 and a cylinder 37, which can be operated, for instance, with pressurized oil as the pressure medium.

At the stem 32 is provided a dog 40, with which two stops are associated. The one stop, 41, is provided for the opening direction. It includes a pawl 42 which is attached to a slide 43, which is adjustable by means of a screw-threaded spindle 44. The spindle 44 can be rotated, for instance, by a motor 45, in such a way that the stop 41 can be adjusted in the range between 15 and 30% of the maximum aperture cross section of the valve.

Another stop 47, which acts in the closing direction of the valve disk 22, can likewise be adjusted by means of the slide 43. It limits the closing movement to an opening cross section between 0 and 15%. Thus, the opening and the closing limiters, 41, 47 are dependent on each other. However, disengaging the pawl 42 makes possible a complete opening for normal operation, regardless of the position of the slide 43; the clearance cross section of the valve is then the same as the aperture cross section of the live-steam line 2.

In normal operation, the fast acting valve 8 is open and its aperture cross section coincides with the line cross section, so that the flow of the live steam is practically not impeded. Should a break of the live-steam line 2 occur or another defect happen which represents a leak in the live-steam line 2, then the fast-acting valve 8 is closed under the action of pressure medium due to a stimulus initiated by probes, not shown in FIG. 2, in the event of a leak. For this purpose, the cylinder 37 is acted upon by a pressure medium source of redundant design, e.g., a pressurized-oil tank 50, in a controlled manner via a valve 51. The closing time is as short as possible; it is, for instance, 2 seconds.

If the closing of the fast-acting valve 8, to which the simultaneous closing of corresponding valves at the other steam generators of the plant corresponds, leads to a pressure increase, perhaps because a fast shutdown of the reactor (scramming) it not possible quickly enough, the valve disk 22 is lifted up at a pressure of, for instance, 1.2 the nominal pressure of the installation, because the counterforce that acts in the closing direction is overcome. The closing force may stem here from the pressure on the piston 36, which is controlled in a suitable manner. However, also other forces are conceivable as holding forces in the closed position, e.g., spring support which furnishes a defined closing force.

For an opening movement of the valve disk 22 triggered by the steam pressure in the line 2, the travel is limited by the pawl 42 and the slide 43. The limited opening travel takes care that no more than half the aperture cross section of the valve is released. The opening travel of the valve disk 22 is preferably so small that 30% or less is available for blowing-off the overpressure in the line 2. It is thereby prevented that the flowout rate leads to disturbances in the steam generator 1, particularly to breaks of the heat exchanger tube bundle, which constitutes the wall separating the primary and the secondary loop of the pressurized-water reactor installation.

In the description above of the operation, it was initially assumed as a simplification for ease of understanding that in the event of a closing command, the fast-acting valve 2 shuts off the live-steam line 2 completely. Through the closing limiter with the stop 47, provision can be made, however, that the fast-acting valve 8 can be closed, in the event of a fast-closing not belonging to normal operation, during operational live-steam production of more than 30% of the nominal output, only to a gap of about 10% for a short time of, say, 20 seconds. For this reason, overpressure cannot build up immediately and the output control can usually throttle the steam production during the 20 seconds mentioned to the extent that also after the complete closing, no further lifting of the valve disk 22 is to be expected. In any case, so-called fluttering of the valve disk 22 is hereby prevented. The gap 25, which is set by the closure limiter, can be adapted to the operational steam production as it can be expected that the steam production is reduced in the event of a shutdown the faster as was the smaller the original power output. However, it is also possible to run the closure limiter 47 closed, starting from the maximum value, in a time-dependent and proportional manner after a fast shut-off, for instance, by means of a clock mechanism (not shown). A further possibility is a control as a function of the steam pressure (not shown). The objective is here always to close the fast-acting valve 8 so fast and completely as is possible without an impermissible pressure rise in the generator that no radioactivity can get out of the containment with the steam due to damage to the generator.

Figure 3:
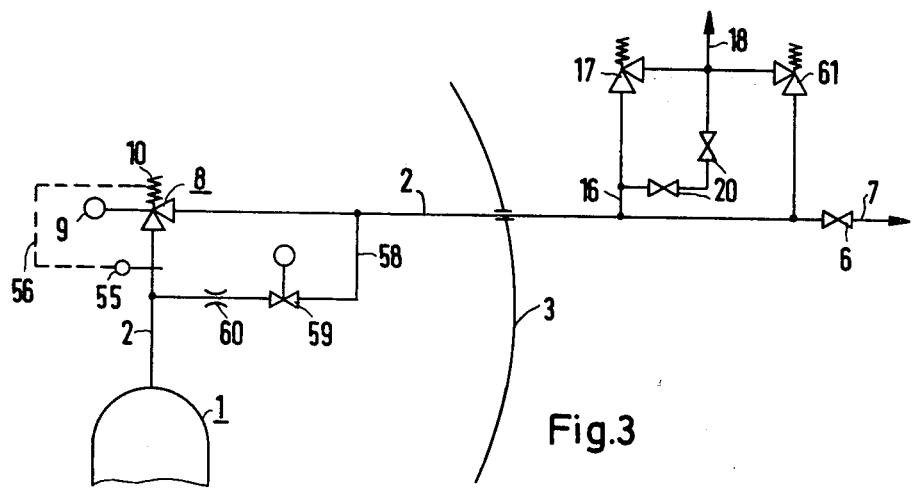
FIG. 3 is similar to FIG. 1, but shows a variation.

In FIG. 3 is shown by a schematic presentation similar to FIG. 1 that the fast-acting valve 8 with the pressure-medium actuator 9 can also be equipped with pressure-dependent servo control. To this end, the pressure in the live-steam line 2 between the steam generator 1 and the fast-acting valve 8 is ascertained by a probe in the form of a manometer 55. Depending on the magnitude of this pressure, the opening mechanism, indicated by the spring 10, of the fast-acting valve acting as a safety valve, and among other things, also the position of the stop 42, can be adjusted so, as indicated by the functional line 56, that sufficient blow-off is possible without excessive flow velocities.

In parallel to the fast-acting valve 8, a bypass line 58 is provided which includes a valve 59, which can be closed by motor power, with a nominal diameter of 400 mm. In series with the valve 59 is disposed a choke 60 for limiting the flow which takes care that the maximally permissible outflow rate of the steam generator 1 cannot be exceeded even if the valve 59 is completely open. The bypass line 58 merely serves to increase the safety for the case that the fast-acting valve 8 does not open properly in the event of a pressure increase.

In the embodiment example according to FIG. 3, the line 16 with the safety valve 17 and the blowdown control valves 20 outside the containment 3 is bypassed by a further safety valve 61, which is provided for reasons of redundancy.

Figure 4:
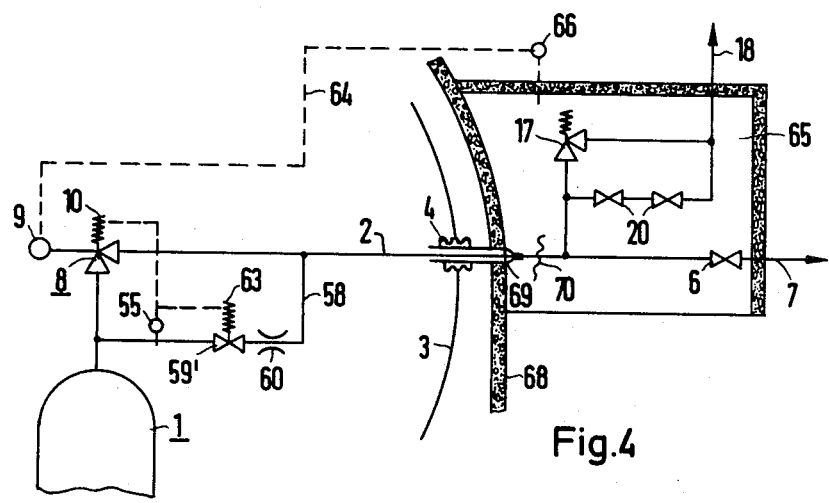
FIG. 4 is also similar to FIG. 1, but not only shows a variation, but also a portion of a nuclear building.

In the embodiment example according to FIG. 4, in which the fast-acting valve 8 is again provided with the bypass line 58, its valve 59' is controlled as a function of pressure. The manometer 55 therefore acts not only on the opening mechanism 10 of the safety valve 8, but also on the motor drive of the valve 59', indicated by the spring 63.

In the embodiment example according to FIG. 4, the closing mechanism 9 of the fast-acting valve 8 is operated, as indicated by the functional line 64, as a function of the pressure in a valve chamber 65, which is provided outside of the containment 3 as an addition to a secondary shield 68 which consists of concrete and encloses the containment. As the valve chamber 65 contains the shut-off valve 6 for the live-steam outlet 7, the part of the live-steam line 2 between the feed-through 4 through the containment 3 and the shut-off valve 6, which cannot be shut off by the valve 6, and which is in part enclosed by a double tube 69, can be monitored by the manometer 66. The closing of the fast-acting valve 8 can thus be initiated by a pressure increase in the valve chamber 65 if, for instance, due to a leak 70 increased pressure is produced, which is determined by the manometer 66.

The valve chamber 65 also contains the safety valve 17 and the blowdown control valves 20. Care must therefore be taken that the outlet 18 is in connection with the free atmosphere at least to the extent that the opening of the safety valve 17 or of the blowdown valves 20 does not lead to a pressure increase at the manometer 66 which triggers the closing of the fast-acting valve 8.

In the embodiment examples, only one steam generator with a live-steam line was shown. In the nuclear reactor installations with two to four steam generators common for large power ratings, a fast-acting valve 8 according to the invention will be assigned to each live-steam line 2.

What is claimed is:

1. A controllable valve for the live steam line extending from the inside to the outside of the containment of a nuclear reactor plant comprising:
   (a) a valve body having an inlet, an outlet and a valve seat, each with a cross section corresponding to that of the live steam line;
   (b) probe means in the live steam line for detecting the pressure therein in order to detect a leak in said steam line;
   (c) a movable valve disk disposed within said valve body;
   (d) operating means coupled to said probe means and responsive thereto for moving the valve disk to a closed position in the event of a leak in the live steam line, said operating means being further responsive to the application of the pressure on the valve disk in excess of the normal operating pressure of the live steam line to move the valve toward an open position; and
   (e) limiting means for limiting the reopening of the valve in response to said excessive pressure to a maximum of one half the outlet cross section, whereby after closing, in response to a leak in the live steam line, said valve will reopen to prevent a build-up of pressure on its inlet side to prevent damage to the nuclear reactor plant.

2. The valve of claim 1 in which the disk has retard means for holding it from opening for more than about 30% of said aperture cross section under the force of said excessive pressure, at least for a short time interval.

3. The valve of claim 2 in which said retard means is adjustable.

4. The valve of claim 3 in which the valve disk has an operating stem and the said retard means comprises an adjustable mechanical stop for the stem and powered means for adjusting the stop.

5. The valve of claim 1 in which said operating means is for sequentially partially closing and thereafter fully closing the valve disk on the valve seat, under said force which is overcome by said excessive pressure.

6. The valve of claim 5 in which said partial closing leaves the valve with a residual aperture cross section of from 5% to 20% of said maximum aperture cross section.

7. The valve of claim 5 in which said partial closing is adjustable.

8. The valve of claim 1 in which said valve disk and valve seat have conical surfaces differently angled to form an annular Venturi when the valve disk is partially closed on the seat.

9. The valve of claim 1 in which the fast-acting valve is inside said containment.

10. The valve of claim 1 in which said operating means has a statically stored energy source controllably connected thereto.

* * * * *